(12) United States Patent
Walters et al.

(10) Patent No.: US 11,245,513 B2
(45) Date of Patent: *Feb. 8, 2022

(54) SYSTEM AND METHOD FOR AUTHORIZING TRANSACTIONS IN AN AUTHORIZED MEMBER NETWORK

(71) Applicant: Capital One Services, LLC, McLean, VA (US)

(72) Inventors: Austin Grant Walters, Savoy, IL (US); Reza Farivar, Champaign, IL (US); Jeremy Edward Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/822,928

(22) Filed: Mar. 18, 2020

(65) Prior Publication Data

US 2020/0220711 A1 Jul. 9, 2020

Related U.S. Application Data

(63) Continuation of application No. 16/230,106, filed on Dec. 21, 2018, now Pat. No. 10,637,644.

(51) Int. Cl.
| | |
|---|---|
| *H04L 9/06* | (2006.01) |
| *G06Q 20/06* | (2012.01) |
| *G06Q 20/20* | (2012.01) |
| *G06F 16/23* | (2019.01) |

(Continued)

(52) U.S. Cl.
CPC ........ *H04L 9/0618* (2013.01); *G06F 16/2365* (2019.01); *G06Q 20/065* (2013.01); *G06Q 20/20* (2013.01); *H04L 9/006* (2013.01); *H04L 9/0833* (2013.01); *H04L 2209/38* (2013.01)

(58) Field of Classification Search
CPC ..... H04L 9/0618; H04L 9/0833; H04L 9/006; H04L 2209/38; H04L 9/3247; H04L 9/3236; H04L 9/3297; H04L 2209/56; H04L 9/3239; G06Q 20/065; G06Q 20/20; G06Q 20/3829; G06Q 20/02; G06Q 2220/00; G06Q 20/401; G06F 16/2365

See application file for complete search history.

(56) References Cited

U.S. PATENT DOCUMENTS 5,535,407 A * 7/1996 Yanagawa ................. G07F 7/08
705/39
5,953,709 A * 9/1999 Gilbert ................... G06Q 20/20
705/35

(Continued)

*Primary Examiner* — David Garcia Cervetti
(74) *Attorney, Agent, or Firm* — Kacvinsky Daisak Bluni PLLC

(57) ABSTRACT

In the disclosed transaction processing system, members of an authorized network of consumers and merchants manage account information using blockchain ledgers. Because both consumers and merchants maintain copies of the blockchain, for any consumer/merchant transaction, both entities can quickly validate the transaction because both are aware, via their blockchain entries, of the current status of the account sourcing the transaction, allowing fast and accurate transaction validation without the need to incur the processing charges inherent in traditional fiat currency credit transactions.

20 Claims, 9 Drawing Sheets

(51) Int. Cl.
  *H04L 9/08* (2006.01)
  *H04L 9/00* (2006.01)

(56) References Cited

U.S. PATENT DOCUMENTS

| | | | | |
|---|---|---|---|---|
| RE40,444 E * | 7/2008 | Linehan | G06Q 20/367 | 705/65 |
| 8,060,598 B1 * | 11/2011 | Cook | H04L 45/16 | 709/224 |
| 8,266,066 B1 * | 9/2012 | Wezter | G06Q 10/06 | 705/78 |
| 9,741,036 B1 * | 8/2017 | Grassadonia | G06Q 20/354 | |
| 10,055,715 B1 * | 8/2018 | Grassadonia | G06Q 20/4012 | |
| 10,084,762 B2 * | 9/2018 | Versteeg | H04W 12/04 | |
| 10,250,694 B2 * | 4/2019 | Mankovskii | H04L 67/142 | |
| 10,554,649 B1 * | 2/2020 | Fields | H04L 9/3263 | |
| 11,126,613 B2 * | 9/2021 | Ow | H04L 9/0643 | |
| 2001/0025262 A1 * | 9/2001 | Ahmed | G06Q 40/02 | 705/33 |
| 2004/0024795 A1 * | 2/2004 | Hind | G06F 16/275 | |
| 2004/0083149 A1 * | 4/2004 | Jones | G06Q 40/00 | 705/35 |
| 2004/0122699 A1 * | 6/2004 | Brito | G06Q 10/10 | 705/301 |
| 2005/0154751 A1 * | 7/2005 | Levi | G06Q 10/10 | |
| 2006/0094499 A1 * | 5/2006 | Amemiya | A63F 13/79 | 463/29 |
| 2006/0131392 A1 * | 6/2006 | Cooper | G06Q 20/40 | 235/380 |
| 2006/0149671 A1 * | 7/2006 | Nix | G06Q 20/40 | 705/40 |
| 2008/0228647 A1 * | 9/2008 | Kachel | G06Q 30/04 | 705/42 |
| 2008/0249848 A1 * | 10/2008 | Kay | G06Q 30/0239 | 705/14.25 |
| 2008/0249926 A1 * | 10/2008 | Sgaraglio | G06Q 40/00 | 705/30 |
| 2009/0172035 A1 * | 7/2009 | Lessing | G06Q 30/02 | |
| 2009/0293104 A1 * | 11/2009 | Levi | G06Q 10/06 | 726/4 |
| 2009/0299909 A1 * | 12/2009 | Levi | G06Q 40/04 | 705/36 R |
| 2014/0222632 A1 * | 8/2014 | Dhakephalkar | G06Q 40/12 | 705/30 |
| 2014/0310172 A1 * | 10/2014 | Grossman | G06Q 40/42 | 705/44 |
| 2015/0120539 A1 * | 4/2015 | Amancherla | G06Q 20/40 | 705/41 |
| 2015/0371224 A1 * | 12/2015 | Lingappa | G06Q 20/401 | 705/71 |
| 2016/0260169 A1 * | 9/2016 | Arnold | G06Q 20/381 | |
| 2016/0267605 A1 * | 9/2016 | Lingham | G06Q 40/12 | |
| 2016/0335628 A1 * | 11/2016 | Weigold | G06Q 20/3829 | |
| 2016/0342976 A1 * | 11/2016 | Davis | G06Q 20/065 | |
| 2016/0342978 A1 * | 11/2016 | Davis | G06Q 20/40 | |
| 2016/0342989 A1 * | 11/2016 | Davis | G06Q 20/3827 | |
| 2016/0342994 A1 * | 11/2016 | Davis | G06Q 20/027 | |
| 2017/0004506 A1 * | 1/2017 | Steinman | G06Q 20/4016 | |
| 2017/0046806 A1 * | 2/2017 | Haldenby | G06Q 20/367 | |
| 2017/0161734 A1 * | 6/2017 | Bankston | G06Q 20/3829 | |
| 2017/0213209 A1 * | 7/2017 | Dillenberger | H04L 9/3247 | |
| 2017/0230189 A1 * | 8/2017 | Toll | H04L 63/0823 | |
| 2017/0235970 A1 * | 8/2017 | Conner | G06F 16/27 | 707/690 |
| 2017/0236121 A1 * | 8/2017 | Lyons | G06Q 20/065 | 705/71 |
| 2017/0243212 A1 * | 8/2017 | Castinado | H04L 9/3236 | |
| 2017/0243214 A1 * | 8/2017 | Johnsrud | G06Q 20/3823 | |
| 2017/0243217 A1 * | 8/2017 | Johnsrud | G06Q 20/4014 | |
| 2017/0243222 A1 * | 8/2017 | Balasubramanian | G06Q 20/4014 | |
| 2017/0243286 A1 * | 8/2017 | Castinado | H04L 63/08 | |
| 2017/0243287 A1 * | 8/2017 | Johnsrud | G06Q 20/02 | |
| 2017/0250972 A1 * | 8/2017 | Ronda | H04L 9/08 | |
| 2017/0270482 A1 * | 9/2017 | Mohun | G06Q 10/103 | |
| 2017/0344983 A1 * | 11/2017 | Muftic | G06Q 20/3829 | |
| 2017/0357970 A1 * | 12/2017 | Muftic | G06Q 20/26 | |
| 2017/0372417 A1 * | 12/2017 | Gaddam | G06Q 20/06 | |
| 2018/0005203 A1 * | 1/2018 | Grassadonia | G06Q 20/102 | |
| 2018/0005229 A1 * | 1/2018 | Grassadonia | G06Q 20/3221 | |
| 2018/0018723 A1 * | 1/2018 | Nagla | H04L 63/08 | |
| 2018/0025442 A1 * | 1/2018 | Isaacson | G06F 3/048 | 705/26.62 |
| 2018/0032383 A1 * | 2/2018 | Surcouf | H04L 9/088 | |
| 2018/0039667 A1 * | 2/2018 | Pierce | G06F 16/2365 | |
| 2018/0046992 A1 * | 2/2018 | Hanrahan | G06Q 20/0658 | |
| 2018/0054491 A1 * | 2/2018 | Mankovskii | H04L 67/142 | |
| 2018/0063099 A1 * | 3/2018 | Versteeg | H04W 12/02 | |
| 2018/0068130 A1 * | 3/2018 | Chan | G06F 21/64 | |
| 2018/0075453 A1 * | 3/2018 | Durvasula | G06Q 20/389 | |
| 2018/0075527 A1 * | 3/2018 | Nagla | G06Q 40/025 | |
| 2018/0082359 A1 * | 3/2018 | Hilmola | G06F 16/58 | |
| 2018/0083786 A1 * | 3/2018 | Dierks | G06Q 20/3678 | |
| 2018/0089641 A1 * | 3/2018 | Chan | G06Q 40/06 | |
| 2018/0091524 A1 * | 3/2018 | Setty | H04L 9/0643 | |
| 2018/0101914 A1 * | 4/2018 | Samuel | G06Q 20/102 | |
| 2018/0121911 A1 * | 5/2018 | Hallam | G06Q 20/10 | |
| 2018/0150488 A1 * | 5/2018 | Runchey | H04L 67/42 | |
| 2018/0150865 A1 * | 5/2018 | Arora | G06Q 20/409 | |
| 2018/0158051 A1 * | 6/2018 | Arora | G06Q 20/20 | |
| 2018/0158139 A1 * | 6/2018 | Krajicek | G06Q 40/025 | |
| 2018/0181954 A1 | 6/2018 | Sinton et al. | | |
| 2018/0189781 A1 * | 7/2018 | McCann | G06Q 20/202 | |
| 2018/0191714 A1 * | 7/2018 | Jentzsch | H04L 63/126 | |
| 2018/0197173 A1 * | 7/2018 | Durvasula | G06Q 20/209 | |
| 2018/0225640 A1 * | 8/2018 | Chapman | G06Q 20/0855 | |
| 2018/0225660 A1 * | 8/2018 | Chapman | G06Q 20/3827 | |
| 2018/0254887 A1 * | 9/2018 | Ateniese | G06F 3/0619 | |
| 2018/0268401 A1 * | 9/2018 | Ortiz | G06Q 20/204 | |
| 2018/0276666 A1 * | 9/2018 | Haldenby | G06Q 20/20 | |
| 2018/0276710 A1 * | 9/2018 | Tietzen | G06N 20/00 | |
| 2018/0285839 A1 * | 10/2018 | Yang | H04L 9/3239 | |
| 2018/0293553 A1 * | 10/2018 | Dembo | G06Q 20/0655 | |
| 2018/0308117 A1 * | 10/2018 | Gupta | G06Q 20/36 | |
| 2018/0308134 A1 * | 10/2018 | Manning | G06Q 30/0277 | |
| 2018/0315027 A1 * | 11/2018 | Kumar | H04L 63/062 | |
| 2019/0005469 A1 * | 1/2019 | Dhupkar | G06Q 20/06 | |
| 2019/0005491 A1 * | 1/2019 | Grassadonia | G06Q 20/3821 | |
| 2019/0012695 A1 * | 1/2019 | Bishnoi | G06Q 20/322 | |
| 2019/0020468 A1 * | 1/2019 | Rosenoer | H04L 63/0414 | |
| 2019/0028276 A1 * | 1/2019 | Pierce | G06Q 20/02 | |
| 2019/0034888 A1 * | 1/2019 | Grassadonia | G06Q 20/4012 | |
| 2019/0034903 A1 * | 1/2019 | Arora | G06Q 20/20 | |
| 2019/0057379 A1 * | 2/2019 | Chalakudi | G06Q 20/38215 | |
| 2019/0058590 A1 * | 2/2019 | Watanabe | G06Q 20/0658 | |
| 2019/0068562 A1 * | 2/2019 | Iyer | H04L 9/3213 | |
| 2019/0073666 A1 * | 3/2019 | Ortiz | G06F 16/27 | |
| 2019/0080406 A1 * | 3/2019 | Molinari | G06Q 40/02 | |
| 2019/0081789 A1 * | 3/2019 | Madisetti | G06Q 20/401 | |
| 2019/0088062 A1 * | 3/2019 | Unagami | G06F 21/31 | |
| 2019/0088063 A1 * | 3/2019 | Unagami | H04L 63/08 | |
| 2019/0104102 A1 * | 4/2019 | Khan | G06F 16/27 | |
| 2019/0114182 A1 * | 4/2019 | Chalakudi | H04L 9/0618 | |
| 2019/0116142 A1 * | 4/2019 | Chalakudi | H04L 67/1097 | |
| 2019/0156363 A1 * | 5/2019 | Postrel | H04L 67/2833 | |
| 2019/0172021 A1 * | 6/2019 | Watson | H04L 9/0838 | |
| 2019/0172026 A1 * | 6/2019 | Vessenes | H04L 9/3247 | |
| 2019/0229926 A1 * | 7/2019 | Handa | G06Q 20/401 | |
| 2019/0238550 A1 * | 8/2019 | Zhang | H04L 67/1046 | |
| 2019/0251187 A1 * | 8/2019 | Lin | G06F 16/27 | |
| 2019/0305958 A1 * | 10/2019 | Qiu | G06Q 20/065 | |
| 2019/0305966 A1 * | 10/2019 | Qiu | H04L 9/3239 | |
| 2019/0347658 A1 * | 11/2019 | Haimes | G06Q 20/04 | |
| 2019/0361874 A1 * | 11/2019 | Fukuchi | G06F 16/2379 | |
| 2020/0051071 A1 * | 2/2020 | Wu | G06Q 20/223 | |
| 2020/0066072 A1 * | 2/2020 | Galvez | G07C 9/00309 | |
| 2020/0125738 A1 * | 4/2020 | Mahatwo | G06F 21/64 | |
| 2020/0351074 A1 * | 11/2020 | Wood | H04L 63/067 | |
| 2021/0097795 A1 * | 4/2021 | Manchovski | H04L 9/088 | |

\* cited by examiner

SYSTEM AND METHOD FOR AUTHORIZING TRANSACTIONS IN AN AUTHORIZED MEMBER NETWORK

RELATED APPLICATION

This application is a continuation of U.S. patent application Ser. No. 16/230,106, titled "SYSTEM AND METHOD FOR AUTHORIZING TRANSACTIONS IN AN AUTHORIZED MEMBER NETWORK" filed on Dec. 21, 2018. The contents of the aforementioned application are incorporated herein by reference in their entirety.

BACKGROUND

Although today's credit card transactions often take seconds or less to authorize, there are many parties involved in clearing the transaction. For example, credit card transactions frequently occur because of interactions between merchants, acquiring banks, credit card associations, credit card issuers and consumers.

Credit card associations, such as Visa®, MasterCard® and American Express®, act as custodians and clearing houses for their respective card brand. The primary responsibilities of card associations include governing their members, establishing interchange fees and qualification guidelines, acting as the arbiter between issuing and acquiring banks, maintaining and improving the card network and making a profit.

Acquiring banks, or "merchant banks" are registered members of card associations that contract with merchants to create and maintain merchant accounts that allow merchants to accept credit and debit cards. Acquiring banks deposit funds from credit card sales into a merchant's bank account. Payment gateways may also provide portals that route transactions to acquiring banks, for example through the use of online shopping carts and the like.

Credit card issuers issue credit cards to consumers. Issuing banks pay acquiring banks for purchases that their cardholders make, and the cardholder is responsible for repaying the issuing bank under the terms of their credit card agreement.

Card issuers, acquiring banks and payment gateways all level fees on either or both of the merchants and card members for each transaction. Therefore, while the current payment authorization network can quickly authorize consumer purchases, they are expensive. For example, there may be wholesale fees charged by credit card issuers and credit card associations. On top of the wholesale fees, merchants may incur credit card processing fees, payable to acquiring banks or payment gateways.

It would be desirable to identify a system and method for quick, reliable processing of consumer transactions without the inherent expenses of current credit card processing systems.

SUMMARY

According to one aspect of the invention, a method for authorizing transactions received from nodes of an authorized network of nodes at a Point-Of-Sale (POS) device of a merchant includes receiving a transaction from a node coupled to the POS device, the transaction including a request to modify a state of an account of the node. The state of the account of the node is preferably managed by a blockchain, and the transaction includes a blockchain update request comprising an account value and a transaction value. The method includes the steps of retrieving a blockchain copy from a memory of the POS device, comparing the account value of the blockchain update request to an account value of the blockchain copy, comparing the account value of the blockchain copy to the transaction value and in response to the steps of comparing, selectively authorizing the transaction by validating the blockchain update request. With such an arrangement, POS transactions can be quickly and reliably processed without incurring the expenses often inherent in managing centralized fiat currency.

According to another aspect of the invention, a device for use by a merchant to authorize transactions received from a node is provided, where both the node and the device are members of an authorized network of nodes. At least a subset of nodes is associated with one or more accounts and the state of each account of each node is managed by a blockchain such that copies of each blockchain are maintained at each node of the authorized network. The device includes a storage device to store a first copy of a blockchain associated with an account of a node, a local interface to receive a transaction from the node, the transaction including a blockchain update request including a node identifier, an account value, and a transaction value and blockchain control logic. The blockchain control logic includes an authentication unit, coupled to the local interface, to authenticate the transaction request using the first copy of the blockchain and a validation unit to selectively authorize the transaction in response to the account value and the transaction value of the blockchain update request. The blockchain control logic also includes blockchain update logic, comprising a queue for storing a plurality of transactions received at the device and a network interface for periodically forwarding the plurality of transactions in bulk to a coupled central authentication server.

According to a further aspect of the invention, a method for authorizing transactions received at a merchant device from a member node is provided. The member node and the merchant device are preferably members of an authorized network of nodes which manages at least one account of at least one node in the authorized network using a blockchain. The method includes the steps of receiving a transaction from a member node coupled to the merchant device including a request to modify a state of an account of the member node, wherein the state of the account of the member node is managed by a blockchain and the transaction includes a blockchain update request comprising an account value and a transaction value. The method includes the steps of retrieving a blockchain copy from a memory of the merchant device, selectively authorizing the transaction in response to the transaction and at least one of the copy of the blockchain and a received validation of the blockchain update from a different node in the authorized network of nodes and forwarding the blockchain update request to a central authorization server. In response to receipt of a validation from the different node, the method includes the steps of generating an updated block including the state of the account of the member node following the transaction, broadcasting the updated block to the authorized network, appending the updated block to the copy of the blockchain; and storing the copy of the blockchain in the memory.

DETAILED DESCRIPTION

Figure 1:
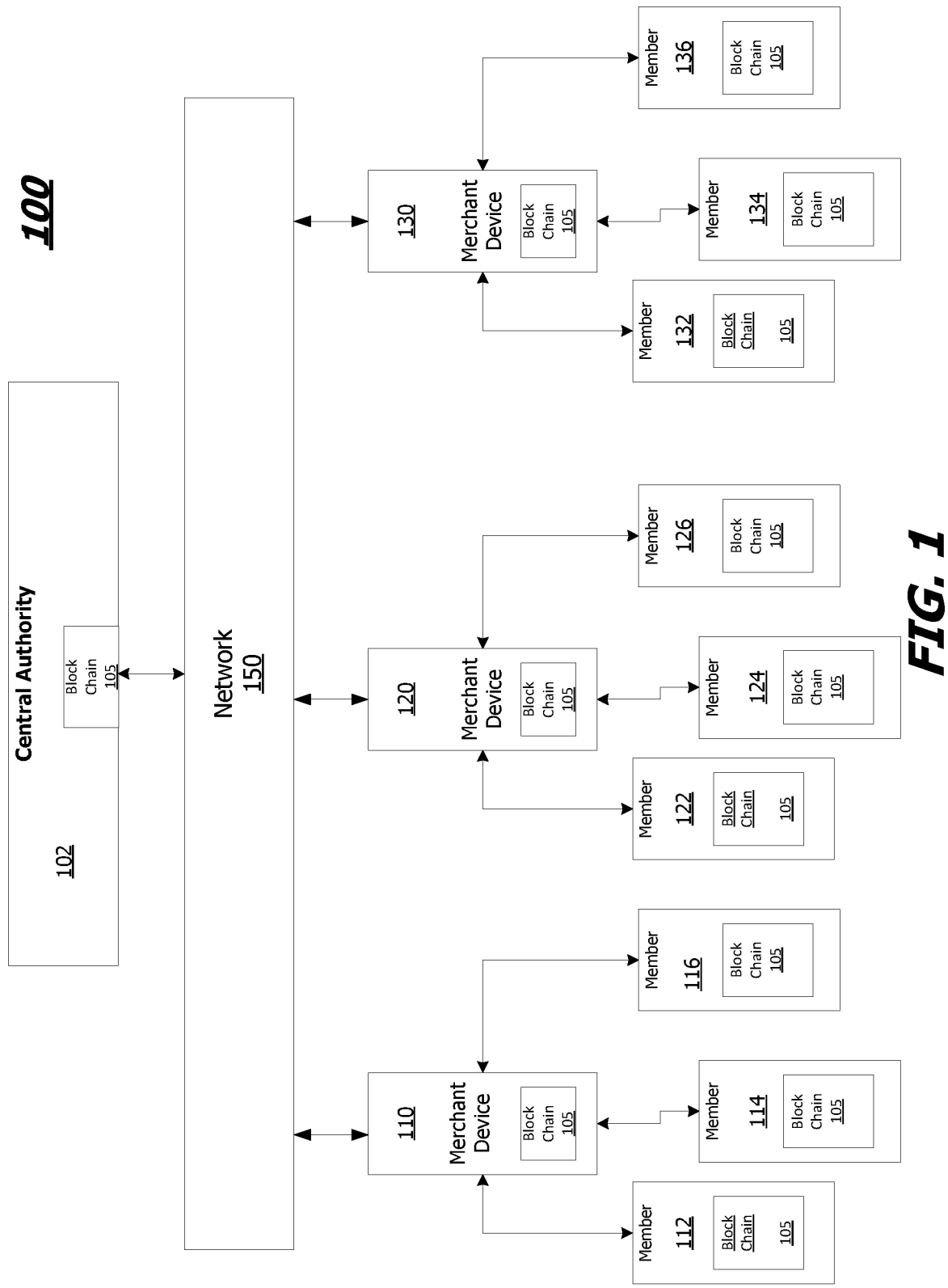
FIG. 1 is a block diagram of one exemplary implementation of a transaction processing system according to aspects of the present invention.

In a system that provides fast, reliable transaction processing, members of an authorized network manage account information using blockchain ledgers. An authorized network is a network of members which have been admitted to the network by a central authority. For example, a central authority may be a credit card issuer, bank, or other entity that manages typical fiat currency payment accounts for a consumer. Members of the authorized network include both consumers and merchants. Because both the consumer and the merchant maintain copies of the blockchain, for any consumer/merchant transaction, both entities can quickly validate the transaction because both are aware, via their blockchain entries, of the current status of the account sourcing the transaction. With such an arrangement, fast and accurate transaction validation can be provided without incurring the processing charges inherent in traditional fiat currency credit transactions.

In one embodiment, the components that are used to support member blockchain transactions are provided in a transaction device having substantially a look and feel of a traditional credit card and including both memory and processing capability. In alternate embodiments, the components that are used to support member blockchain transactions are implemented using dedicated software operating on a smart device of the consumer. In either embodiment, members may maintain multiple accounts on a single member device, wherein each account may be associated with a different authorized network.

These and other features of the invention will now be described with reference to the figures, wherein like reference numerals are used to refer to like elements throughout.

As used in this application, the terms "system" and "component" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

FIG. 1 is a block diagram illustrating several components that may be found in a transaction processing system 100 of the present invention. System 100 is shown to include a central authority 102 coupled via network 150 to one or more merchant devices 110, 120 and 130. Each merchant device 110, 120 and 130 is communicatively coupled to one or more members devices. For example, the merchant device 110 is shown coupled to member devices 112, 114 and 116, the merchant device 120 is shown coupled to member devices 122, 124 and 126, the merchant device 130 is shown coupled to member devices 132, 134 and 136. For the purposes herein, the term 'communicatively coupled' means that each device includes communication and interface logic that enables the devices to exchange blockchain messages and other information. The logic may provide for either or both of direct coupling of the member device and the merchant (i.e., a card reader or the like), and/or may include logic for communicating over a network, such as a wireless or Bluetooth network.

Member devices, in one embodiment, comprise portable transaction devices comprising memory and processing capabilities. In some embodiments, member devices may include credit-card like devices comprising memory and processing capabilities to support the functions described herein. In some embodiments, member devices may comprise so-called 'smart' cards, credit cards having embedded processors, cellular phones, tablet devices and the similar devices.

Herein, an "authorized network" includes members and merchant devices that have been authorized by a central authority to access and modify an authorized account. The members and merchant devices communicate using blockchain messages that enable modification of an account according to a defined consensus protocol. Every member of an authorized network stores a blockchain for the authorized account. Thus, in the embodiment of FIG. 1, merchant devices 110, 120 and 130 as well as members 112, 114, 116, 122, 124, 126, 132, 134 and 136 together form the authorized network for an account managed by blockchain 105, and therefore each store a copy of blockchain 105.

Figure 2:
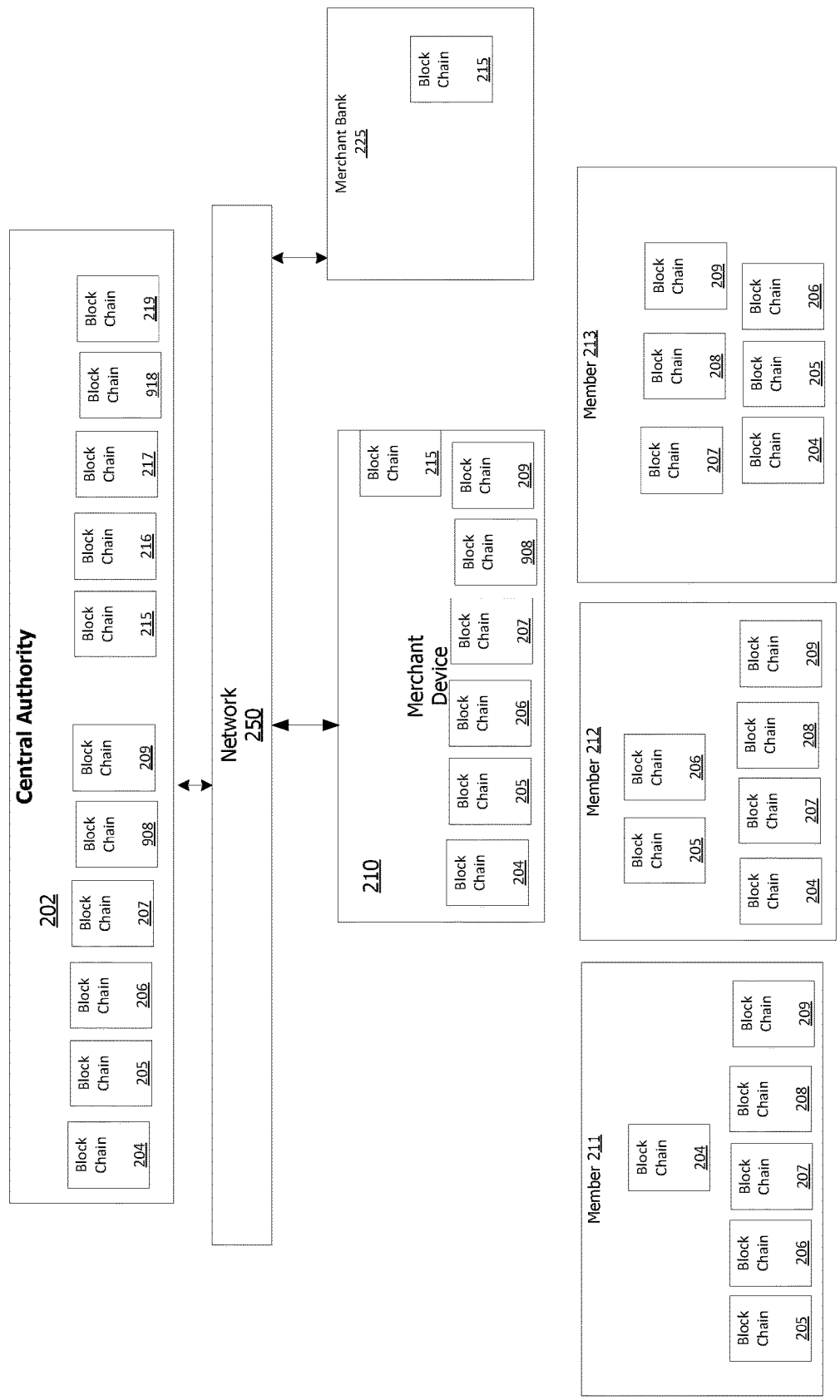
FIG. 2 is a block diagram of a second exemplary implementation of a transaction processing system according to aspects of the present invention.

FIG. 2 illustrates a second embodiment of a transaction system 200, wherein members may be part of more than one authorized network, and concomitantly store blockchain copies for multiple authorized accounts. The authorized networks may include currency networks disclosed herein and cryptocurrency accounts, such as Bitcoin, Litecoin, Ethereum and the like. According to one aspect, members may have multiple authorized accounts. Multiple accounts may be managed by a single blockchain, separate accounts may be managed by separate blockchains, or some accounts may be managed by blockchains while others are managed using existing fiat-based account management systems. For example, while member 211 has only one authorized account for its own use (managed by blockchain 204), it is shown to be a member of other authorized networks which manage accounts for members 212 and 213. Member 212 may have a virtual wallet (a.k.a. "e-wallet") having access to multiple accounts, each account managed by a respective blockchain 205, 206. Member device 213 may have an e-wallet that provides access to three accounts, as managed by blockchains 207, 208 and 209. As described, each member of the authorized network stores blockchain information for the authorized network account. Thus member 211, in addition to storing the blockchain 204 for its own account, also stores copies of the blockchains 205 and 206 for member 212 accounts, and stores copies of blockchains 207, 208 and 209 for member 213 accounts. Member 212 stores copies of blockchain 204 for member 211's account, as well as copies of blockchains 207, 208 and 209 for member 213 accounts. In addition to blockchains 207, 208 and 209, member 213 stores copies of blockchains 204, 205 and 206, for member 211 and member 212's accounts. As such, each member can validate the transactions of other members in the authorized network.

Merchant device 210 similarly stores blockchains for all accounts of all authorized networks which the merchant device is a member. Thus, the merchant device stores blockchains 204-209, associated with member device accounts. The merchant device 210 also advantageously stores blockchains (such as blockchain 215) for merchant accounts; i.e., merchant banks that receive the funds of the transaction. As with the central authority 202, a merchant bank 225 associated with the merchant may include a copy of the merchant devices blockchain 215. Such an arrangement allows the merchant device 210 to transact with the merchant bank 225 using processes and protocols substantially similar to those that occur between the member device 211 and the merchant device 210.

The central authority stores blockchains for all accounts that have been authorized by the central authority. Accordingly, central authority stores blockchains 204-209 that can be used as part of the validation of transactions by merchant 210. In addition, the central authority may store other blockchains 215-219, associated with other authorized accounts for other merchants (not shown).

Figure 3:
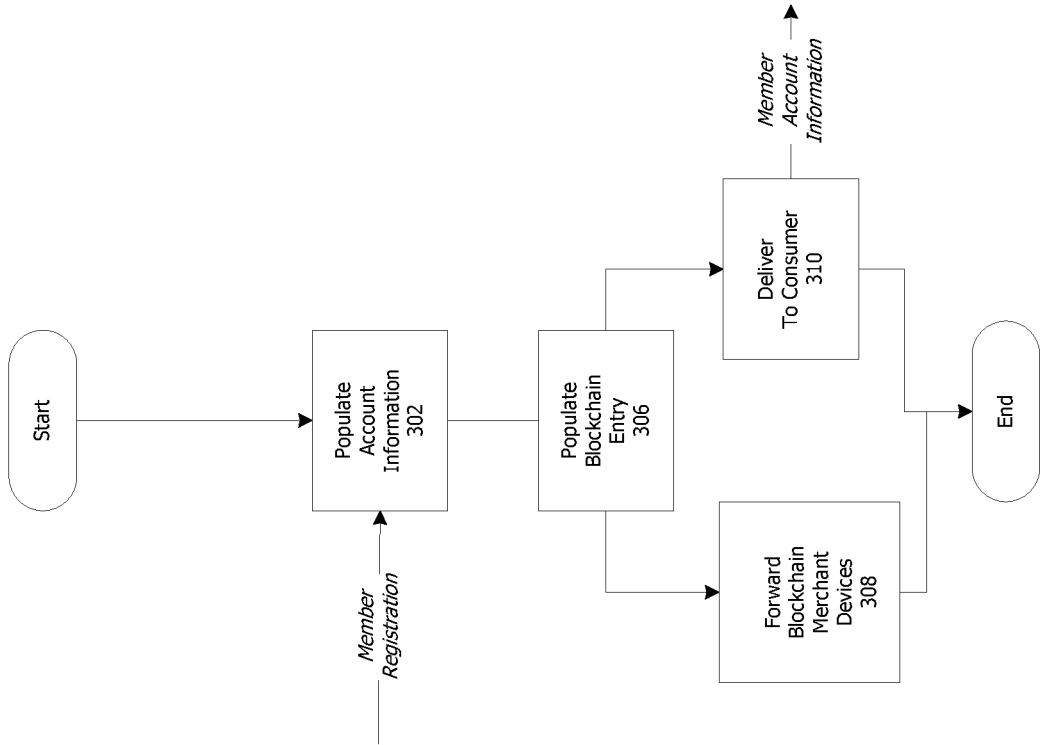
FIG. 3 is a flow diagram illustrating exemplary steps that may be performed to populate the authorized networks of FIG. 1 or FIG. 2 with blockchain account information.

FIG. 3 illustrates exemplary steps that may be performed in one embodiment of a process 300 for initial setup of an authorized account that may be used to manage transactions according to principles of the present invention. At step 302 a member opens an account with a central authority, such as a bank, card issuer, cryptocurrency issuer or the like. At step 302 the central authority populates an initial blockchain block using information related to the account, such as a member number, an account number, and an account value. The central authority may also provide one or more of a public key and/or private key to the member, to be used to authenticate the member during a transaction.

At steps 308 and 310, the central authority distributes the blockchain to the merchant devices and the member devices. The blockchain is stored in the memory of the member device, together with any other blockchains of authorized networks, prior to physical delivery of the device to the member consumer. In some embodiments, a member device may also be hardcoded with the private key for the member.

Once the blockchain is provided to the member, it may also be provided to the merchants that the member intends to transact with. Which merchant devices are selected to receive the blockchain may be determined in response to a variety of considerations, including whether the account is merchant specific (i.e., limited to use at a particular merchant, such as a store specific credit card), or a general-purpose account (i.e., may be used at a variety of merchants, such as a Visa card). For merchant specific cards, the central authority can distribute the blockchains for each member account to the specific merchants. The distribution may be geographically limited based on an address of the member, although this is not required.

For general-purpose accounts, the particular merchants to forward the blockchains may be selected using predictive algorithms, for example based on historical or expected spending habits of the member. Alternatively, the blockchains may be broadcast to and stored by all merchants accepting payments from the particular card type.

In alternate embodiments, the blockchain is delivered to the merchant by the central authority only following the first initial use of the member device at the merchant. It is understood that this initial population may result in incurred delay in an initial transaction, although the effect of this delay on the overall efficiency of the transactions is minimal. To overcome the problems associated with initially populating merchant devices in this manner, a merchant may allow the member to 'check in' with their authorized network when they first arrive at the store or merchant website. During this check in, the member may communicably connect with the merchant device, forwarding account information and private/public key information to the merchant. The merchant may, in turn, forward this information to the central authority, which authenticates the member. Following authentication, the central authority may then populate the merchant's copy of the blockchain for the member's account. When the member is ready to perform a transaction, it may be quickly and reliably verified using the process of FIG. 4.

Figure 4:
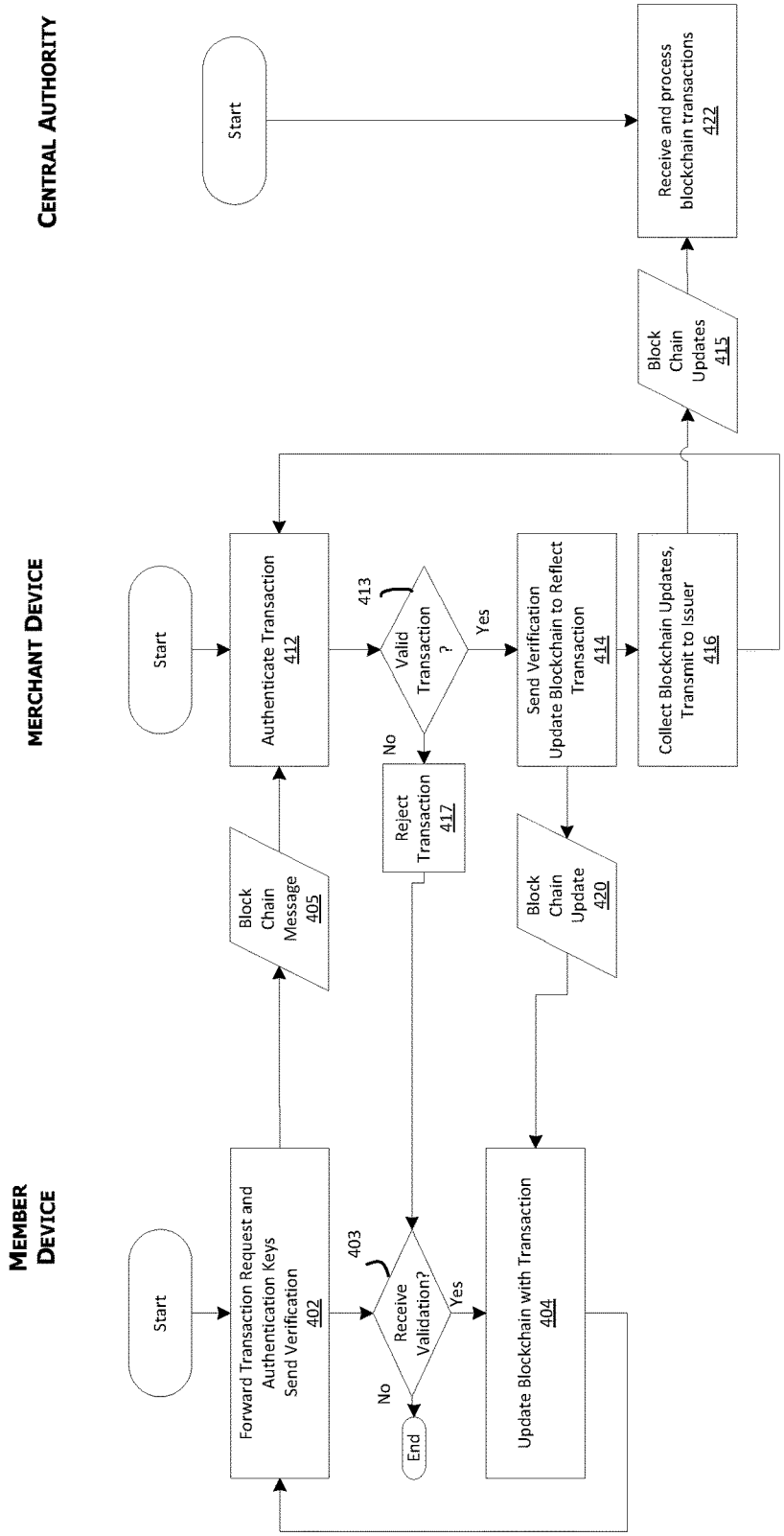
FIG. 4 is a flow diagram illustrating exemplary steps that may be performed during processing of transactions in either the system of FIG. 1 or the system of FIG. 2.

FIG. 4 illustrates exemplary steps that may be performed during a transaction process 400 by each of the member devices 211, the merchant device 210 and central authority 202. At step 402 the member device 211 communicably couples to the merchant device 210, forwarding a blockchain message 405 including information associated with the desired transaction, including the resulting account balance and public/private key information. At step 403 the member device 211 awaits validation. At step 412, the merchant device 210 authenticates the transaction by comparing the key received as part of the transaction against previously stored key information associated with the client, and at step 413 validates the blockchain transaction by first establishing that the blockchains are synchronized, and then establishing that the account balance represented in the merchant device's blockchain copy corresponds to the account balance as represented in the member devices blockchain message. By 'synchronized' it is meant that each of the devices stores the same information regarding the current status of the account.

If it is determined at step 413 either that the blockchain copy at the merchant is not synchronized with the member account, or that there are insufficient funds in member's account, then at step 417 the merchant rejects the transaction, sending a rejection signal or other indication to the member device. The member device, receiving the rejection at step 403, terminates the transaction.

If, however, it is determined at step 413 that there are sufficient funds in a synchronized blockchain account, then at step 414 the merchant device 210 validates the transaction, sending a validation signal as part of a blockchain update 420 to the member device 211 and updating the blockchain to reflect the changes to member's account as a result of the transaction.

At step 414 the merchant device initiates the process of updating the blockchain copies of other members and blockchain copies of the central authority. Because the member device and merchant device are both able to accurately validate blockchain transactions, it is realized that a network load advantage can be obtained without adversely affecting the accuracy of the transaction by bundling together blockchain updates and sending the transactions together in bulk to the central authority for processing. At step 416, a merchant device taking advantage of this feature collects blockchain updates 415 and subsequently transmits the blockchain updates the central authority to enable it to update the blockchain copy.

The number of blockchain updates which are bundled together is a matter of design choice, which may vary based on, inter alia, available memory and/or processing speed of the merchant device, the communication medium of network 250 and the loading at the central authority. In one embodiment, for example, ten blockchain updates may be forwarded in a bundle to the central authority, although the present invention is not limited to any particular number of bundled transactions.

While the process of FIG. 4 describes a transaction between an authorized member device and an authorized merchant device, similar processes may be used to reliably and efficiently move funds between any two members of an authorized network, including member devices, merchant devices, central authorities, etc. The processing of the blockchain transaction as described in FIG. 4 may result in the generation of a new blockchain transaction by the merchant device 210 to transfer funds to merchant bank 225.

Figure 5:
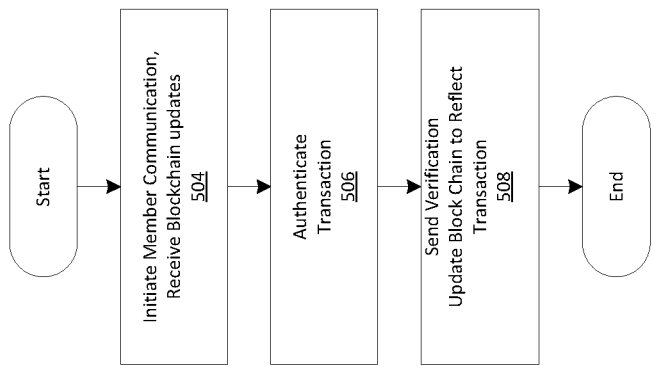
FIG. 5 is a flow diagram illustrating exemplary steps that may be performed by member devices of an authorized network of FIG. 1 or FIG. 2.

Referring now to FIG. 5, a process 500 for updating blockchains of authorized members is provided. At step 504, as each member device communicates with the merchant device 210, blockchain updates for all the accounts which the member device is an authorized member are received by the member device. This update process may occur as part of the transaction process of FIG. 4 when the member device is physically connected (for example inserted or swiped) at a merchant device. Alternatively, for smart member devices including wireless capability, the update process may occur over a wireless network when the member device is within transmit range of a transmitting member device of the authorized network.

At step 506 the member device authenticates each received blockchain transaction. In one embodiment this may be done by determining whether the account balances, pre-transaction, are synchronized, and if so, at step 508 validating the blockchain update. In embodiments which seek to maintain the confidentiality of account information and values, blockchain contents may be hashed, and the authentication step may compare hashed values to validate transactions. Other methods of securing blockchain data or validating transactions may be substituted herein without affecting the scope of the invention.

In one embodiment, the blockchain entries are validated by setting a 'valid' flag within a blockchain entry. Certain consensus protocols may require that a minimum number of members of the authorized network validate a first blockchain transaction prior to a member being able to perform a second transaction on the account.

Figure 6:
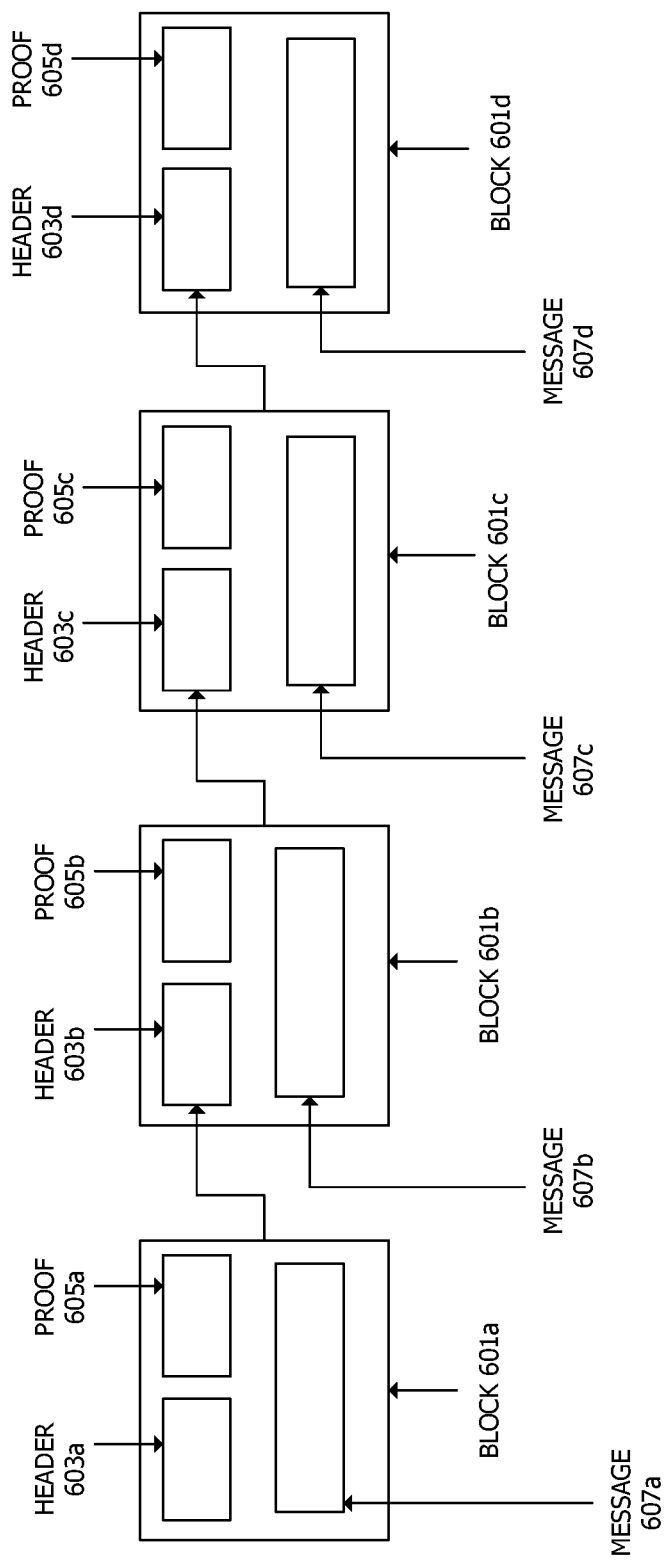
FIG. 6 illustrates exemplary components of a blockchain which may be used to support the process of FIG. 4.

FIG. 6 depicts a logical model 600 of an exemplary blockchain 105, consistent with disclosed embodiments. Such exemplary blockchains may comprise blocks, such as blocks 601a-601d. Blocks may include messages, such as message 607b and message 607d. Generally, blocks may include a header, such as headers 603a-603d, which uniquely identifies each block. The headers 603a-603d may include a hash value generated by a hash function. A hash function is any function that can be used to map input data of arbitrary size to a hash value of a fixed size. For example, a header may include at least one of the previous block's hash value, a hash value generated based on any messages in the block (e.g., a Merkle root), and a timestamp. Consistent with disclosed embodiments, system 100 may require that blocks added to blockchain 105 satisfy at least one of a proof-of-work condition (e.g., a proof 605a-605d) and a digital signature condition. It should be noted that although Proof-of-Work is described, other consensus mechanisms, such as Proof-of-Stake, Proof-of-Activity, or other messaging controls agreed to by the parties may be substituted here. For example, the headers 603a-603d may include a nonce chosen to ensure the header satisfies the proof-of-work condition. As a non-limiting example, the proof-of-work condition may require the hash of the header fall within a predetermined range of values. As an additional example, the header may be digitally signed with a cryptographic key of an authorized system, and the digital signature may be included in the header. This digital signature may be verified using a key available to the members of system 100. Generally, one or more designated nodes of an authorized member network (e.g., the member device or merchant device) may generate blocks 601 including headers 602, proofs 605, and messages 607 to initiate a payment transaction over the authorized network.

Figure 7:
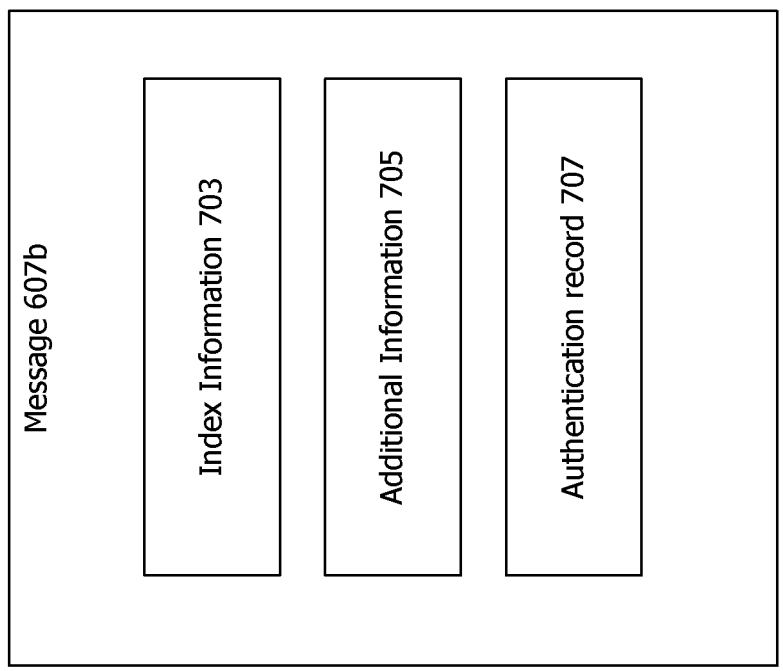
FIG. 7 is a detailed illustration of a blockchain of FIG. 6.

FIG. 7 depicts a logical model of a message 607b stored in a blockchain (e.g., an element of blockchain 105), consistent with disclosed embodiments. As will be described in more detail in FIGS. 8 and 9, in some embodiments, a designated component of the system generates blockchain messages such as the message 607b. In some embodiments, message 607b may comprise index information 703. In certain aspects, index information 703 may comprise information identifying a user. For example, index information 703 may be at least one of a full name, email address, phone number, or other non-sensitive personal information of the user. In various aspects, index information 703 may include one or more references to earlier blocks in the blockchain 105. For example, index information 703 may include one or more references to one or more earlier blocks associated with the same user. A reference may include, as a non-limiting example, a hash of a preceding block in the blockchain associated with the same user. In some embodiments, index information 703 may be obfuscated or encrypted according to methods known to one of skill in the art. For example, index information 703 may be encrypted with a cryptographic key. As an additional example, index information 703 may comprise a hash of the at least one of a full name, email address, phone number, or other non-sensitive personal information of the user.

Message 607b may comprise a monetary transaction consistent with disclosed embodiments, including a transaction value.

Cryptographic keys may be used to encrypt elements of messages in blocks, consistent with disclosed embodiments. Cryptographic keys may be associated with members of the system 100 (e.g., merchant devices, member devices, central authorities). In various aspects, at least some of the cryptographic keys may be associated with authorized systems. Corresponding cryptographic keys may be available to decrypt the encrypted message elements, consistent with disclosed embodiments. For example, when an element of a message in a block is encrypted with a symmetric key, the same symmetric key may be available for decrypting the encrypted element. As another example, when an element of a message in a block is encrypted with a private key, a corresponding public key may be available for decrypting the encrypted element and the corresponding cryptographic keys may be available to members of the authentication system.

Figure 8:
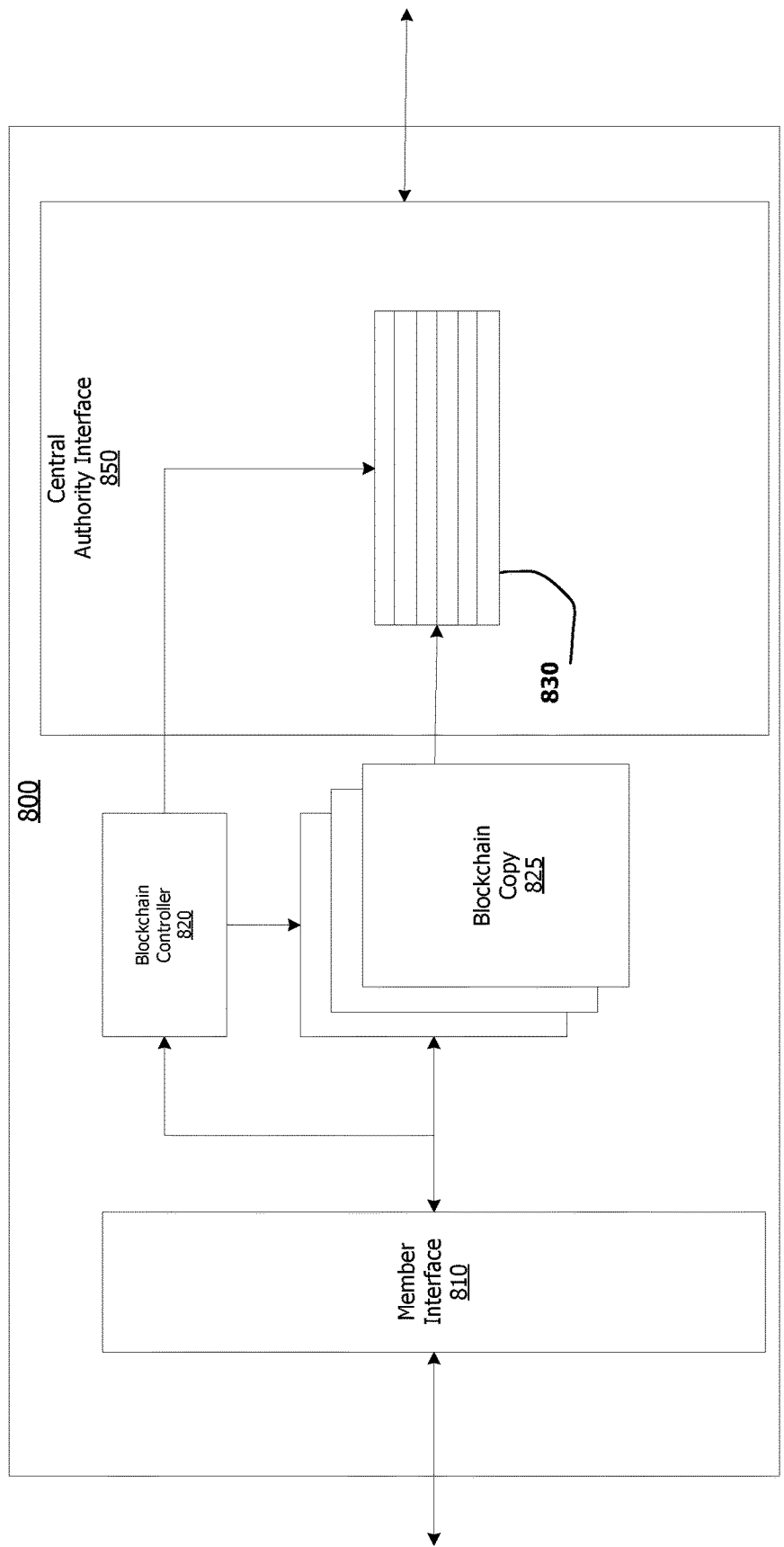
FIG. 8 is a block diagram illustrating exemplary components of a merchant device of FIG. 1 or FIG. 2.

FIG. 8 illustrates exemplary components that may be included in a merchant device 800, for example, a Point-Of-Sale (POS) device such as a card reader. The merchant device 800 includes a member interface 810 for exchanging transactions with authorized members and a credit authority interface 850 for updating blockchain copies maintained, for example, by the card issuer. A blockchain controller 820 may be a processor optimized to perform blockchain transactions using the protocols described herein. For example, the blockchain controller may be programmed to authenticate the members using the private and public keys, to extract account information, such as account balances and account owner, and to extract transaction information such as a transaction amount. The blockchain controller may also be programmed to validate a blockchain transaction in response to key data, transaction amounts and account balances. Interface 850 is shown to include a data queue 830 of blockchain entries, collected as described with regard to FIG. 4 prior to bulk transfer of the entries to the appropriate central authority.

Figure 9:
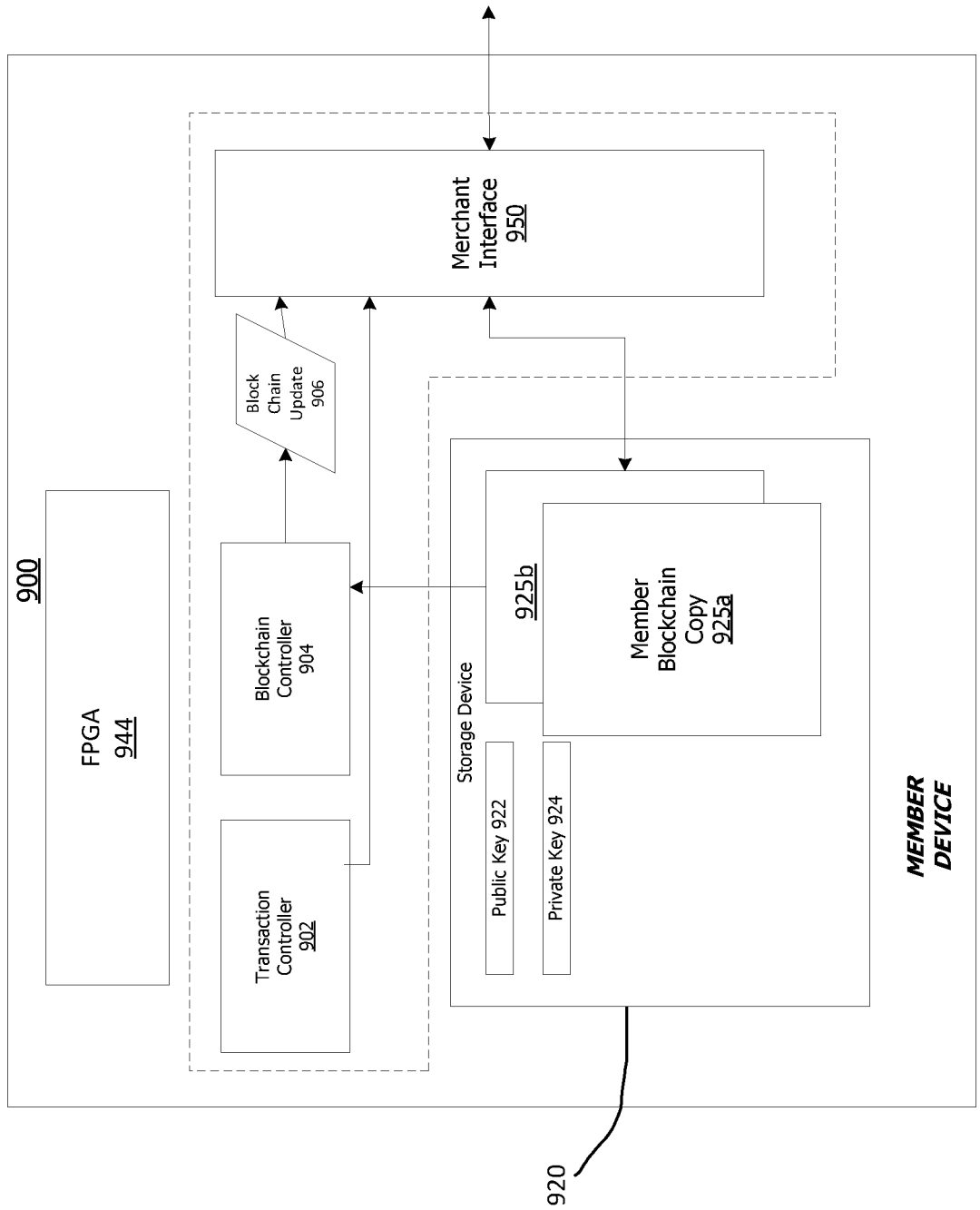
FIG. 9 is a block diagram illustrating exemplary components that may be included in a member node of FIG. 1 or FIG. 2.

FIG. 9 illustrates exemplary components that may be included in a member device 900 according to aspects of the invention. The member device 900 includes a merchant interface 950, a transaction controller 902, and a blockchain controller 904. The member device further may comprise a storage device 920, that may be used to store both authentication information, such as public key 922 and private key 924, and one or more blockchains such as blockchains 925a and 925b. According to one aspect, transaction device 900 may also include a Field Programming Gate Array (FPGA) which may be optimized prior to or during currency transactions for improved performance of the currency operations of the transaction device as described in U.S. patent application Ser. No. 16/230,106 entitled "A SYSTEM AND METHOD FOR OPTIMIZING CRYPTOCURRENCY TRANSACTIONS" filed on even date herewith and incorporated by reference.

Although two blockchains 925a, 925b are shown, it is appreciated that the number of blockchains maintained by a transaction device 900 will vary depending upon the number of currency accounts available to a user of the transaction device. Each blockchain may be associated with the same or different currency accounts. The currency accounts may be associated with the same or different currency networks. For example, it is contemplated that a transaction device may store blockchains for fiat currency networks using the consensus protocols described herein, and may also store blockchains for cryptocurrency accounts including, but not limited to, cryptocurrency networks such as Bitcoin, Ethereurm, PeerCoin, LiteCoin and the many variants thereof.

In one embodiment, the transaction controller 902 forwards information regarding a transaction, including a transaction amount and a transaction account (i.e., the sourcing account for the transaction) to the blockchain controller. The transaction information may be received from the member operating the device or from the merchant, from the merchant, or some combination thereof. For example, when the member device is a smart card, the member may interface with a POS using a keypad; wherein after ringing up a sale the member is asked to authorize a transaction of a given amount. In some embodiments, the member may also be prompted to specify which of the e-wallet type accounts of the card should be used to source the transaction.

Upon approval of the transaction, the transaction controller forwards the account information and transaction value to the blockchain controller 904. The blockchain controller uses this information to build a block such as block 601a shown in FIG. 6. Thus, the blockchain controller 904 includes logic to build a header, nonce, and proof of work, or to otherwise provide authentication attributes according to an agreed-upon blockchain protocol. The resultant block 906 is forwarded to the merchant interface 950. As described above, one or more fields of the block may be encoded using the public key 922, private key 924 or some combination thereof for authentication and security purposes. Following validation, as described above, the blockchain update 906 may be added to blockchain 925. Memory 920 is also coupled to receive and store blockchain updates for authorized member device accounts.

Although FIG. 9 describes components that may be included on a smart card, the transaction processing protocol and method is not limited to use with smart cards. Alternative implementations of FIG. 9 using functionality provided by a smartphone or other intelligent device may also be used, and thus the present invention is not limited to any particular implementation of member devices, merchant devices or central authority structures.

Accordingly, a system and method have been described that enables fast, accurate merchant transactions with fewer intermediaries and concomitant costs. Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A system, comprising:
    an authorized network of nodes comprising a plurality of nodes and a plurality of merchant devices, wherein each of the nodes is associated with at least one account, and a state of each account of each node is managed by a blockchain such that copies of each blockchain are maintained by at least a portion of the plurality of nodes and merchant devices;
    a merchant device of the plurality of merchant devices comprising a network interface coupled with the authorized network of nodes, storage, memory, and at least one processor coupled with the network interface, the storage, and the memory, and the storage to store a first copy of the blockchain;
    the at least one processor configured to execute instructions stored in the memory, that when executed, cause the at least one processor to:
        receive, via the network interface, a transaction request from a node of the plurality of nodes, the transaction request including a blockchain message including a key, an account balance of an account associated with the node and maintained in a second copy of the blockchain on the node, and a transaction value;
        retrieve, from the storage, a stored key associated with the account;
        authenticate the transaction request using the first copy of the blockchain by comparing the key against the stored key associated with the account;
        determine the first copy of the blockchain and the second copy of the blockchain are synchronized based on the account balance;
        validate the transaction request based on the first copy of the blockchain and the second copy of the blockchain determined to be synchronized; and
        authorize the transaction request in response to the transaction request based on the transaction request being authenticated and validated.

2. The system of claim 1, comprising the processor to:
    store a plurality of transactions in the storage of the merchant device; and
    periodically cause, via a network interface, communication of the plurality of transactions to a central authority server to update the blockchain.

3. The system of claim 2, the processor to periodically cause, via the network interface, communication of the plurality of transactions to at least a portion of the nodes and merchant devices.

4. The system of claim 1, wherein validate the transaction request further comprises the processor to determine the account has sufficient funds based on the transaction value.

5. The system of claim 1, wherein validate the transaction request further comprises receiving one or more blockchain validation messages from corresponding one or more other nodes indicating the first copy of the blockchain and the second copy of the blockchain are synchronized.

6. The system of claim 1, the processor to generate an updated block representing an updated state of the account of the node following the authorization and validation of the transaction request.

7. The system of claim 1, the processor to reject the transaction when the transaction request cannot be authenticated, validated, or both.

8. A computer-implemented method, comprising:
    receiving, via a network interface of a merchant device, a transaction request from a node of a plurality of nodes in an authorized network nodes, the transaction request including a blockchain message including a key, an account balance of an account associated with the node and maintained in a second copy of a blockchain on the node, and a transaction value;
    retrieving, from storage of the merchant device, a stored key associated with the account;

authenticating, by processing circuitry of the merchant device, the transaction request using a first copy of the blockchain by comparing the key against the stored key associated with the account;

determining, by the processing circuitry, the first copy of the blockchain and the second copy of the blockchain are synchronized based on the account balance;

validating, by the processing circuitry, the transaction request based on the first copy of the blockchain and the second copy of the blockchain determined to be synchronized; and authorizing, by the processing circuitry, the transaction request in response to the transaction request based on the transaction request being authenticated and validated.

9. The method of claim 8, comprising:
storing a plurality of transactions in a storage of a merchant device; and
periodically causing, via a network interface, communication of the plurality of transactions to a central authority server to update the blockchain.

10. The method of claim 8, comprising periodically causing, via the network interface, communication of the plurality of transactions to at least a portion of the nodes and merchant devices.

11. The method of claim 8, wherein validating the transaction request further comprises determining the account has sufficient funds based on the transaction value.

12. The method of claim 8, wherein validating the transaction request further comprises receiving one or more blockchain validation messages from corresponding one or more other nodes indicating the first copy of the blockchain and the second copy of the blockchain are synchronized.

13. The method of claim 8, comprising generating an updated block representing an updated state of the account of the node following the authorization and validation of the transaction request.

14. The method of claim 8 comprising rejecting the transaction when the transaction request cannot be authenticated, validated, or both.

15. At least one non-transitory computer-readable medium comprising a set of instructions that, in response to being executed on a computing system, cause the computing system to:

receive, via a network interface of the computing system, a transaction request from a node of a plurality of nodes of an authorized network, the transaction request including a blockchain message including a key, an account balance of an account associated with the node and maintained in a second copy of a blockchain on the node, and a transaction value;

retrieve, from storage of the computing system, a stored key associated with the account;

authenticate the transaction request using a first copy of the blockchain by comparing the key against the stored key associated with the account;

determine the first copy of the blockchain and the second copy of the blockchain are synchronized based on the account balance;

validate the transaction request based on the first copy of the blockchain and the second copy of the blockchain determined to be synchronized; and authorize the transaction request in response to the transaction request based on the transaction request being authenticated and validated.

16. The medium of claim 15, the computing system to:
store a plurality of transactions in a storage of a merchant device; and
periodically cause, via a network interface, communication of the plurality of transactions to a central authority server to update the blockchain.

17. The medium of claim 15, the computing system to periodically cause, via the network interface, communication of the plurality of transactions to at least a portion of the nodes and merchant devices.

18. The medium of claim 15, wherein validating the transaction request further comprises determining the account has sufficient funds based on the transaction value.

19. The medium of claim 15, wherein validating the transaction request further comprises receiving one or more blockchain validation messages from corresponding one or more other nodes indicating the first copy of the blockchain and the second copy of the blockchain are synchronized.

20. The medium of claim 15, the computing system to generate an updated block representing an updated state of the account of the node following the authorization and validation of the transaction request.

* * * * *